July 14, 1936.  E. H. FORD  2,047,465
COOLING APPARATUS
Original Filed Feb. 16, 1934   2 Sheets-Sheet 1
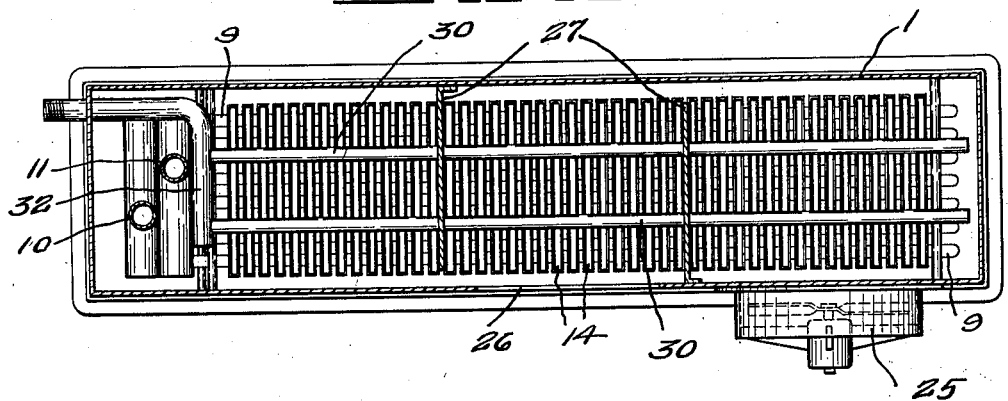
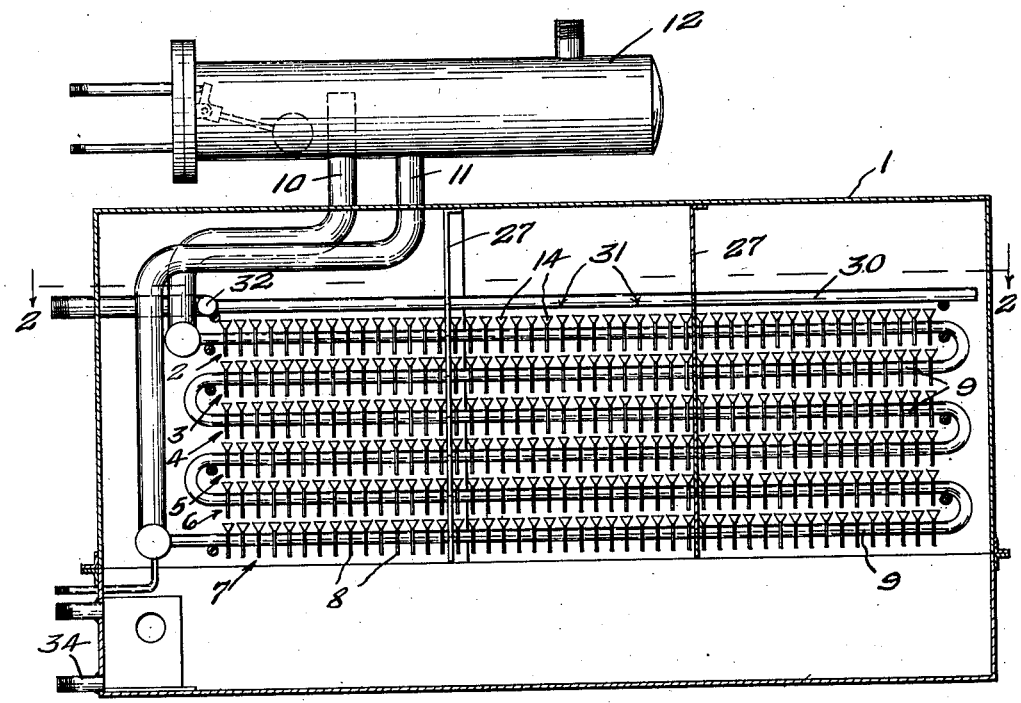
INVENTOR:
Ezra H. Ford,
BY
ATTORNEYS.

July 14, 1936.  E. H. FORD  2,047,465
COOLING APPARATUS
Original Filed Feb. 16, 1934   2 Sheets-Sheet 2
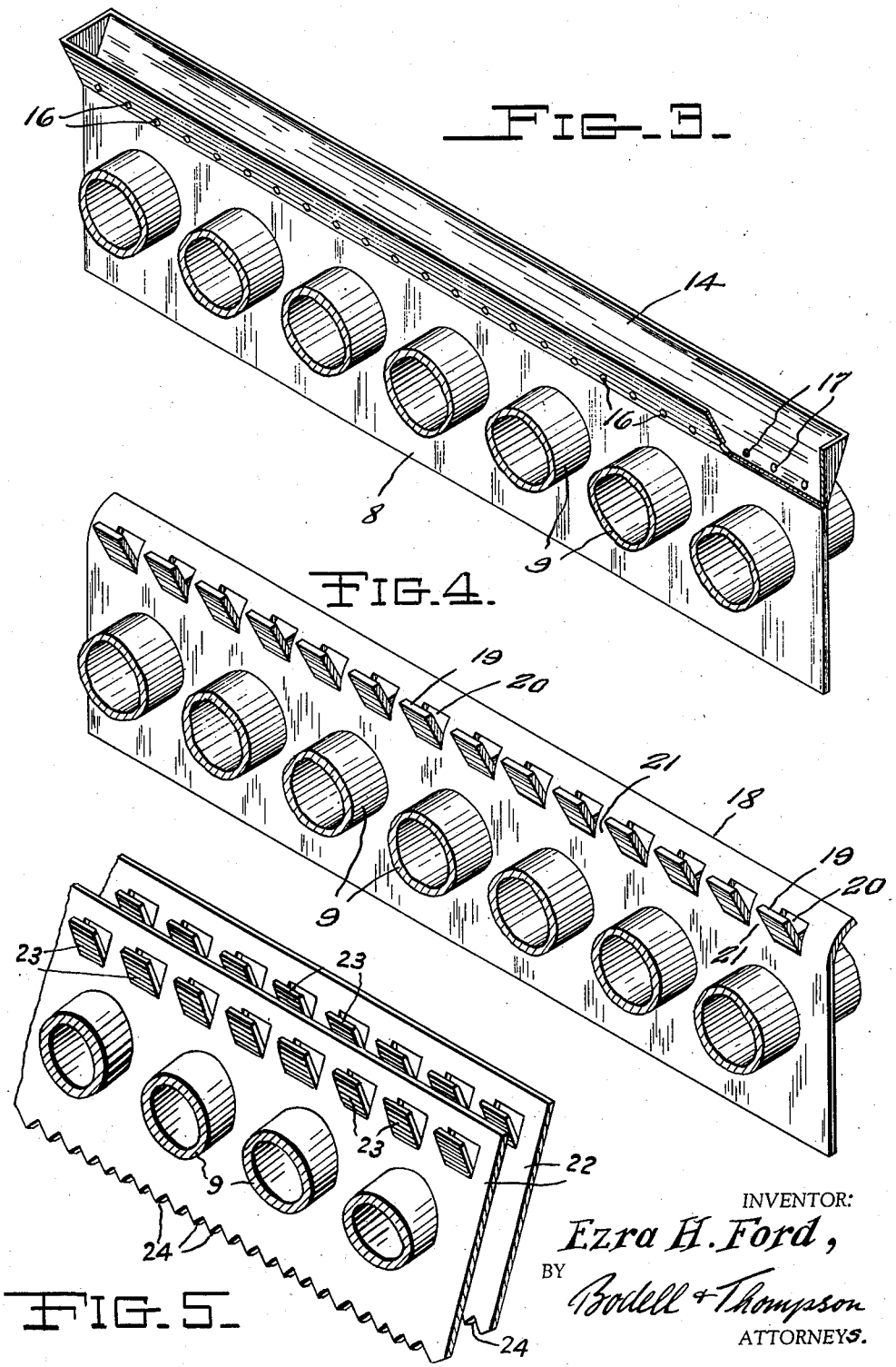
INVENTOR:
Ezra H. Ford,
BY Bodell + Thompson
ATTORNEYS.

Patented July 14, 1936

2,047,465

UNITED STATES PATENT OFFICE 2,047,465

COOLING APPARATUS

Ezra H. Ford, Syracuse, N. Y.

Application February 16, 1934, Serial No. 711,543
Renewed December 19, 1935

10 Claims. (Cl. 257—184)

This invention relates to cooling apparatus, and particularly apparatus for cooling a liquid, and more particularly water to be used for cooling something else, as milk, the cooling of milk after being pasteurized, being more satisfactorily accomplished by water than other mediums.

The invention has for an object, a cooling apparatus provided with means for effecting the cooling of a maximum amount of water with a minimum amount of cooling medium, and occupying the minimum amount of space.

It further has for its object, a cooling apparatus consisting of a series of upright plates arranged in a horizontal row parallel to each other, with refrigerating means for keeping the plates cool, the plates having means, as a troughlike structure at their upper edges, into which the liquid, or water, to be cooled is discharged, the troughlike formation having outlets to discharge and distribute the water in sheets on opposite sides of the plates.

It further has for its object a refrigerating apparatus including a plurality of such series of upright plates arranged in parallel rows, one row below the other, each lower row being arranged to receive the liquid from the next upper rows and having means, as the troughlike structure, for distributing the liquid and water evenly on opposite sides of the plates.

It further has for its object, a cooling apparatus for cooling a liquid, as water, used in cooling milk which can be used to cool the air of the room in which the milk, or other product, is stored, it being understood that heretofore two apparatuses have been used, one to cool the fluid, and one to cool the store room.

The invention consists in the novel features and in the combinations and constructions hereinafter set forth and claimed.

In describing this invention, reference is had to the accompanying drawings in which like characters designate corresponding parts in all the views.

Figure 1 is a side elevation, with the casing in section, of this cooling apparatus.

Figure 2 is a sectional view on the plane of line 2—2, Figure 1.

Figure 3 is an isometric view of one form of cooling plates, the contiguous portions of the refrigerating coils being also shown.

Figure 4 is a view, similar to Figure 3, of the refrigerating plates having a slightly different form of structure from that shown in Figure 3.

Figure 5 is a view, similar to Figures 3 and 4, illustrating another modification of the structure for the plates.

This cooling apparatus includes, generally, a suitable casing, a series of upright plates arranged in a horizontal row and parallel to each other and preferably, a plurality of such rows arranged one below the other, so that the water runs in sheets over the opposite sides of the plates of the upper row, down onto the next lower row, and is distributed on opposite sides of the plates of that row, and refrigerating means for keeping the plates cool. It also includes means for circulating air interchangeably with the water over the plates to cool the air when a liquid is not being cooled, the air thus refrigerated, being passed out of the casing and circulated through the room in which the apparatus is located.

I designates a suitable casing which may be of any suitable form, size and construction. Usually, the cooling apparatus is located in the storage room of the dairy, or brewery. If it is located outside of the storage room, the casing I is usually suitably insulated.

2, 3, 4, 5, 6 and 7 designate rows of upright plates 8, the rows being arranged one above the other. Preferably, the plates are arranged vertically, but may be inclined slightly out of the vertical, as seen in Figure 5. The plates are snugly mounted to form a good mechanical and thermal joint on the horizontal runs 9 of the coils of a refrigerating system, each plate of any one row being formed with a plurality of openings through which the horizontal runs of the coils pass and in which they snugly fit, so that the plates of each row, or series, form fins on the corresponding rows of coils.

The refrigerating system, including the coils, forms no part of this invention, and in addition to the coils, the system includes inlet and outlet pipes 10, 11, communicating with a tank 12 for a refrigerating medium. Each plate is preferably formed with means, at their upper margins, for receiving liquid, as water, to be cooled, and to distribute the water throughout the length of the plates over opposite sides of the plates, and the plates of each lower row 3, 4, 5, 6 and 7 are arranged to receive the liquid as it runs in a sheet from the plates of the next upper row, the plates of the row 3 receiving the liquid from the row 2, and the plates of the rows 4, 5, 6 and 7 being arranged to receive the water dropping respectively from the rows 3, 4, 5 and 6. The plates of the various rows are arranged in vertical alinement.

The means, here illustrated at the upper edges of the plates to receive and distribute the water, may be of any suitable construction, and in the form shown in Figure 3, a troughlike structure 14 is formed, or mounted, on the upper edge of each plate, the trough having downwardly converging sides which are formed with perforations 16, 17, near the bottom of the trough, and arranged to deliver the water on opposite sides of the plates 8. As seen in Figure 4, the troughlike structure is provided by the laterally deflected upper margin 18 of each plate, and by tongues 19 struck from the deflected margin and deflected in the opposite direction, the tongues being spaced apart and providing outlets 20 to one side of the plate, the spaces 21 between the tongues forming surfaces to distribute the water over the other side of the plates.

In the construction shown in Figure 5, the plates are inclined slightly out of the vertical so that their upper margins 22, which form one side of the troughlike structure, are inclined out of the vertical, and form one side of the troughlike structure, the tongues 23 struck therefrom forming the other side.

In order to avoid having the sheets of water tend to flow toward one end of the plates, in case the plates are inclined slightly out of the horizontal, the lower edges may be serrated, as at 24.

My cooling apparatus, in addition to effecting an economical cooling of liquids, is also arranged to act as an air cooler, or air conditioner, which additional use is highly desirable where the cooling apparatus is located in, or adjacent to, the storage room of the dairy, or brewery.

25 is the housing of a fan, or blower, mounted at one side of the casing to discharge into the casing, the casing having an outlet 26. Suitable baffles 27 are located in the casing to cause a current of air to take a tortuous path over the coils and plates. The outlet 26 is here shown as leading from a central compartment formed by the baffle plates, as usually two compartments are sufficient to cool the air to the desired temperature; or in other words, in order to cool the air, it is not necessary to pass the air over all the cooling plates. It may be preferable, in some instances, to arrange the blower to circulate the air upwardly through the casing.

The water, or liquid, to be cooled is delivered to the uppermost rows of plates by supply pipes 30 extending parallel to the coils 9 and transversely of the plates 8 above them, and having outlets 31 alined with the trough formation at the upper edges of the topmost row of plates. The pipes 30 are connected to a suitable header 32 which, in turn, is connected to a source of supply of water, or other liquid.

The housing 1 is formed with an outlet 34 for the cool water from which it is led to any desired point, or to a milk cooling apparatus.

In operation, the refrigerating apparatus, or the plates thereof, are kept cool, and the water is discharged from the pipes 30 into the troughlike structure at the upper edges of the uppermost row 2 of plates, the water running down opposite sides of the plates of the row 2 and discharges into the troughlike means at the upper edges of the next lower rows of plates and thence, in the same manner downwardly over the plates of the rows 4, 5, 6 and 7, where it runs into the lower part of the casing 1 out through the outlet 34. Some of the water, of course, comes into heat exchanging contact with the coils where they intersect the plates. After the apparatus has been used for cooling water for the purpose of using the water to cool milk, the water is shut off and the fan 25 started in order to cool and circulate air through the storage room for the milk to keep the milk, or other products, at the desired temperature.

It will be observed that, because of the structure of the cooling fins, or plates, resulting in a film of water passing over both sides of the plate, the maximum amount of heat is transferred from the water to the cooling coils 9, with the result that my apparatus is extremely compact, and a cooling apparatus of given size will efficiently cool a maximum amount of water. This is not only advantageous from the standpoint of reduced initial cost, but also results in a saving of considerable room which is at a premium in storage spaces.

What I claim is:

1. A cooling apparatus including a plurality of series of upright parallel plates, the series being arranged one above the other, means for delivering a liquid to be cooled to the uppermost series of plates, whereby the liquid flows down opposite sides of the plates in sheets, the next lower series of plates being arranged to receive the liquid from the upper series, and refrigerating means for keeping the plates cool.

2. A cooling apparatus including a plurality of series of upright parallel plates, the series being arranged one above the other, means for delivering a liquid to be cooled to the uppermost series of plates, whereby the liquid flows down opposite sides of the plates in sheets, the next lower series of plates being arranged to receive the liquid from the upper series, the plates of the lower series having means for delivering the liquid to opposite sides thereof, and refrigerating means for keeping the plates cool.

3. A cooling apparatus including a series of upright plates arranged in a horizontal row and parallel to each other, the plates having means at their upper margins for distributing the liquid to be cooled on opposite sides of the plates, means for delivering the liquid to be cooled to the former means, and refrigerating means for keeping the plates cool.

4. A cooling apparatus including a series of upright plates arranged in a horizontal row and parallel to each other, the plates being provided with liquid receivers at their upper margins formed with openings along their upper margins for distributing the liquid to opposite sides of the plates, means for delivering a liquid to be cooled to the former means, and refrigerating means for keeping the plates cool.

5. A cooling apparatus including a series of upright plates arranged in a horizontal row parallel to each other, each plate being provided with troughlike means at their upper edges formed with outlet openings discharging onto the opposite sides of the main body of the plate, and refrigerating means for keeping the plates cool.

6. A cooling apparatus comprising a series of upright plates arranged in a row parallel to each other, the plates having their upper margins extending out of a vertical plane in one direction, and tongues struck from the margin and deflected in the opposite direction, the margin and tongues forming a troughlike structure, the tongues being spaced apart, the openings provided by the tongues forming outlets for the liquid to be cooled to one side of the plates, and the spaces between the tongues forming outlet openings to the opposite side of the plates, means for delivering the liquid to be cooled to the troughlike structure, and refrigerating means for keeping the plates cool.

7. A cooling apparatus including a conduit for a refrigerating medium coiled to have horizontal runs at different levels, cooling plates mounted on the runs in upright position and spaced apart along the same forming on the horizontal runs a series of upright plates arranged parallel to each other, the plates on the lower runs being formed to receive a liquid flowing from the plates on the next upper run and distribute the liquid on opposite sides of the plates.

8. A cooling apparatus including a conduit for a refrigerating medium coiled to have horizontal runs at different levels, cooling plates mounted on the runs in upright position and spaced apart along the same forming on each run of the same level a series of upright plates arranged parallel to each other, the plates of one series being spaced in an edgewise vertical direction from those of the next series, and the plates of a lower series being arranged to receive a liquid flowing from the plates on the next upper series, means for discharging a liquid to be cooled downwardly onto the upper edges of the plates on the uppermost series, the plates having means for distributing the liquid to opposite sides thereof, all whereby the liquid runs in sheets down the opposite sides of the plates on the uppermost series onto the plates of the next lower series and passes, by the distributing means thereof, to opposite sides of the latter plates.

9. A cooling apparatus including a series of upright plates arranged parallel to each other, means for delivering a liquid to be cooled to opposite sides of the plates, whereby the liquid runs by gravity down the opposite sides of the plates over the entire area thereof, and refrigerating means for keeping the plates cool, the plates having means at their lower edges for causing the liquid to run from the lower edges the full length thereof.

10. A cooling apparatus including a series of upright plates arranged parallel to each other, refrigerating means for cooling the plates, means for interchangeably passing a liquid over the plates on opposite sides thereof to cool the liquid, and to pass air over the plates to cool the air, whereby the apparatus is interchangeably adapted to cool a liquid, and to cool the air of a room.

EZRA H. FORD.